United States Patent
Betz et al.

(10) Patent No.: US 10,696,220 B2
(45) Date of Patent: Jun. 30, 2020

(54) ILLUMINATED DECORATIVE PART

(71) Applicant: DAIMLER AG, Stuttgart (DE)

(72) Inventors: Christian Betz, Sindelfingen (DE);
Daniel Betz, Rottenburg-Seebronn (DE); Martin Borowski, Waiblingen (DE); Kevin Moser, Oberdigisheim (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/324,342

(22) PCT Filed: Jul. 31, 2017

(86) PCT No.: PCT/EP2017/000924
§ 371 (c)(1),
(2) Date: Feb. 8, 2019

(87) PCT Pub. No.: WO2018/028817
PCT Pub. Date: Feb. 15, 2018

(65) Prior Publication Data
US 2019/0176692 A1    Jun. 13, 2019

(30) Foreign Application Priority Data
Aug. 9, 2016   (DE) .................. 10 2016 009 660

(51) Int. Cl.
*B60Q 3/00*    (2017.01)
*B60Q 3/66*    (2017.01)
(Continued)

(52) U.S. Cl.
CPC ............. *B60Q 3/66* (2017.02); *B60Q 3/14* (2017.02); *B60Q 3/54* (2017.02); *B60Q 3/60* (2017.02);
(Continued)

(58) Field of Classification Search
CPC .................................................. B60R 13/0256
See application file for complete search history.

(56) References Cited

U.S. PATENT DOCUMENTS 8,836,494 B2 *   9/2014   Reuschel ................. B60Q 3/14
340/438
9,423,094 B2     8/2016   Reuschel et al.
(Continued)

FOREIGN PATENT DOCUMENTS

DE         8816551 U1      11/1989
DE    102005036533 A1      2/2007
(Continued)

OTHER PUBLICATIONS

Examination Report created dated Jun. 15, 2017 in related/corresponding DE Application No. 10 2016 009 660.8.
(Continued)

*Primary Examiner* — Gerald J Sufleta, II
(74) *Attorney, Agent, or Firm* — Patent Portfolio Builders PLLC

(57) ABSTRACT

An illuminated decorative part includes a flat visible side facing an observer and an illumination region behind the visible side as viewed by the observer, which has multiple discrete light sources. At least partially transparent optical elements that influence the light are arranged between the visible side and the illumination region. The optical elements include at least one flat scattering element. The decorative part includes light guides for guiding the light orthogonally to the surface of the visible side arranged between the scattering element and at least one—but not all—of the light sources.

9 Claims, 3 Drawing Sheets

Figure 1:
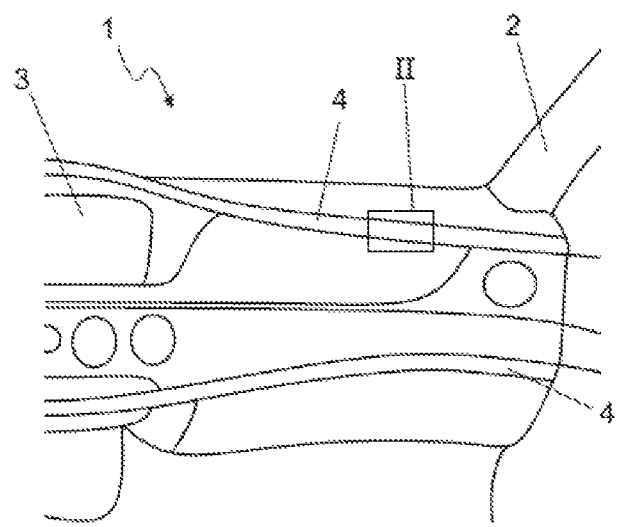

(51) Int. Cl.
*B60R 13/02* (2006.01)
*B60Q 3/54* (2017.01)
*B60Q 3/14* (2017.01)
*B60Q 3/78* (2017.01)
*B60Q 3/64* (2017.01)
*B60Q 3/60* (2017.01)
*B60Q 3/74* (2017.01)

(52) U.S. Cl.
CPC .............. *B60Q 3/64* (2017.02); *B60Q 3/74* (2017.02); *B60Q 3/78* (2017.02); *B60R 13/0256* (2013.01); *B60Q 2500/10* (2013.01); *B60R 2013/0287* (2013.01)

(56) References Cited

U.S. PATENT DOCUMENTS

| | | | | |
|---|---|---|---|---|
| 10,002,552 | B1* | 6/2018 | Gologursky | G09F 13/18 |
| 2001/0022721 | A1* | 9/2001 | Konomi | G02B 6/0063 |
| | | | | 362/23.18 |
| 2004/0255497 | A1* | 12/2004 | Venkataraman | G09F 13/0404 |
| | | | | 40/551 |
| 2007/0035945 | A1* | 2/2007 | Lu | G09F 13/04 |
| | | | | 362/219 |
| 2007/0209254 | A1* | 9/2007 | Perlo | G09F 13/22 |
| | | | | 40/541 |
| 2014/0130387 | A1* | 5/2014 | Pod | G09F 21/04 |
| | | | | 40/575 |
| 2014/0226361 | A1* | 8/2014 | Vasylyev | G02B 6/0025 |
| | | | | 362/606 |
| 2014/0340920 | A1* | 11/2014 | Bayersdorfer | B60Q 3/54 |
| | | | | 362/511 |
| 2016/0321965 | A1* | 11/2016 | Phuklin Prichystal | |
| | | | | B44C 1/228 |
| 2017/0043709 | A1* | 2/2017 | Dellock | F21V 23/003 |
| 2017/0200403 | A1* | 7/2017 | Salter | B60R 13/005 |
| 2017/0355302 | A1* | 12/2017 | Kuramitsu | B60Q 1/50 |
| 2017/0363905 | A1* | 12/2017 | Katsuta | G02B 5/00 |
| 2018/0144668 | A1* | 5/2018 | Gow | G09F 13/22 |
| 2018/0157119 | A1* | 6/2018 | Kim | G02F 1/133615 |
| 2019/0137678 | A1* | 5/2019 | Weeda | G02B 6/0028 |
| 2019/0149152 | A1* | 5/2019 | Kontani | G09F 13/00 |
| | | | | 345/176 |

FOREIGN PATENT DOCUMENTS

| | | |
|---|---|---|
| DE | 102006038421 A1 | 2/2008 |
| DE | 102009030684 A1 | 12/2010 |
| DE | 102010039859 A1 | 3/2012 |
| DE | 102010055129 A1 | 6/2012 |
| DE | 102011014262 A1 | 9/2012 |
| DE | 102011016000 A1 | 10/2012 |
| DE | 102014209521 A1 | 12/2014 |
| DE | 102013011170 A1 | 1/2015 |
| DE | 102014015525 A1 | 4/2016 |
| ES | 2422876 A1 | 9/2013 |
| FR | 2824510 A1 | 11/2002 |

OTHER PUBLICATIONS

International Search Report dated Oct. 30, 2017 in related/corresponding International Application No. PCT/EP2017/000924.
Written Opinion dated Oct. 30, 2017 in related/corresponding International Application No. PCT/EP2017/000924.

* cited by examiner

ILLUMINATED DECORATIVE PART

BACKGROUND AND SUMMARY OF THE INVENTION

The invention relates to an illuminated decorative part.

Illuminated decorative parts, in particular for adjustable ambient lighting within a vehicle, are known from the prior art. Patent DE 10 2009 030 684 A1 by the applicant relates to a decorative element of this type, which has a transparent top layer, into which light can be coupled. Corresponding cut-outs can then be provided in an applied decorative film in order to emit the light through them, in particular into the interior compartment of a vehicle that is equipped with the decorative element.

An illuminated decorative part of the type in question is known by the term 'decorative lighting unit' from DE 10 2010 055 129 A1. The decorative lighting unit consists of a support that is provided with light sources, an optical element in the form of an optical lens, and a diffusor and a mask. A stripe image or another type of image display is inserted between the diffusor and the lens and is then projected by the light sources onto the illuminated surface of the decorative part. The design of the decorative lighting unit in the generic prior art has the disadvantage that, due to the lens and the inserted stripe image in the interior of the decorative lighting part, it requires a relatively large design in the direction of the light emission, i.e. substantially orthogonally to the surface facing the observer of the decorative lighting part. This is disadvantageous for use, for example, in the area of a dashboard of a motor vehicle, since the available installation space here is typically very limited in the depth direction. A further disadvantage consists in the fact that a stripe image is required in order to represent the desired display. Typically, this stripe image is transilluminated in the manner of a transparent photo slide, which leads to a not insignificant loss of light, and which correspondingly limits the optical brilliance that can be achieved with the decorative lighting unit according to the generic prior art.

The problem addressed by the present invention thus involves an illuminated decorative part that can be constructed to be very compact, especially in its overall height in the direction in which the light is emitted, and that nevertheless permits a very brilliant and high-contrast emission of light.

Similar to the generic prior art, the illuminated decorative part according to the invention has optical elements between a flat visible side and an illumination region that is behind the visible side as viewed by the observer. The optical elements in the form of at least one flat scattering element are arranged between the visible side and the illumination region in order to distribute the light from the light sources evenly over the surface of the visible side in the region in which it illuminates the optical scattering element over a distance. The necessary distance between the light sources and the flat scattering element creates an even scattering so that individual light sources can no longer be discretely recognized from the visible side. A volume scattering element, especially one consisting of PMMA, such as df23, with the material known as 0v200, which is marketed under the brand name "Plexiglas," is suitable as a flat scattering element, for example.

According to the invention, it is additionally provided that light guides for guiding the light orthogonally to the surface of the visible side are arranged between the scattering element and at least one—but not all—of the light sources. These light guides, which are arranged between the scattering element and one or more of the light sources in the form of stripes or other geometric patterns, for example, then transfer the light from the light source directly either into a suitably shaped cut-out in the scattering element or, preferentially, in a scattering element that is arranged over the entire surface, onto it. In the preferred embodiment, there is no distance from light guide to the scattering element. Moreover, the distance between the light guide and the light source is much smaller than the distance between the adjacent light sources, which are not connected to the light guide, and the scattering element. In this way, different light intensities are permitted in the region of the scattering element, and so, using strip-like light guides on the surface of the scattering element strip, for example, it is possible to produce stripes with very high light intensity and directed light as well as regions between them with lower light intensity and scattered light.

The light guides according to the invention are not configured to be scattering themselves, but are instead clear in order to permit the best possible transmission of the light into the region of the flat scattering element or into the region of the visible side and/or the decorative layer arranged there.

According to a very advantageous development of the concept, it is possible that the scattering element serves as a support for a decorative layer, which is configured to be entirely or at least partially transparent. A decorative layer such as this can ideally be sprayed onto the scattering element. For example, it can consist of a sufficiently ductile material to ensure crash safety for use in a vehicle despite the use of the optically very high-grade PMMA, which alone would not provide any crash safety. At the same time, the design becomes extraordinarily simple and efficient, since very direct backlighting of the decoration and thus very brilliant light emission into the environment of the illuminated decorative part is possible as a result of the direct connection between the scattering element and the preferentially transparent decorative layer.

In a very advantageous development, it is furthermore possible that the light guides have a non-transparent mask over at least part, preferably all, of the surface on their edges that run perpendicular to the surface of the visible side. The mask can be configured as a lateral sheath on the light guide, for example. Scattered light, which could otherwise exit the light guides transversely to the actual direction of the light transmission, is minimized as a result. The brilliance of the regions of the visible side that are in connection with the light guides compared to the other regions is increased even further, and so an even better contrast of the image generated by the illuminated decorative part becomes possible.

In one advantageous development, the decorative layer can be configured in the optical form of tinted glass, for example. The transparency of the decorative layer is thereby deliberately reduced so that it is translucent only when the light sources are switched on, while it is not translucent when the light sources are switched off. In this way, the elements of the illuminated decorative part can be prevented from being recognized in the deactivated state, which is an advantage with regard to the design in the deactivated state, which is often also called the cold design.

Additionally, or in particular alternatively, it is also possible that a semi-transparent intermediate layer is arranged between the decorative layer and the optical elements, and especially in this case the scattering element that is ideally configured over the entire surface. It is also possible to impede the view of the rear-side elements of the illuminated decorative part using this type of semi-transparent intermediate layer, regardless of the transparent design of the decorative layer, so that a very uniform appearance without translucent functional elements is created in the deactivated state. Especially in the automotive industry, this is also described with the term "black panel design" or "black panel effect."

The semi-transparent intermediate layer can be configured preferably as a film, which is applied to the full-surface scattering element, for example, before the actual decorative layer, in this case the applied film, is sprayed onto it.

According to a further very favorable embodiment of the illuminated decorative part according to the invention, the light sources are configured in the form of a field of light-emitting diodes on a support element. This kind of field and/or a matrix of light-emitting diodes is very simple to produce. The support element itself in this instance can ideally be black in order to further reduce the chance of shining through the transparent visible-side elements. The light-emitting diodes themselves offer the advantage that they can be constructed very compactly with respect to the installation space in the direction in which they emit the light. Moreover, they require less energy, and so the heating of the illuminated decorative part stays within limits when light-emitting diodes are used as a light source, which offers a crucial advantage especially when they are installed in confined spaces, such as within a dashboard of a vehicle. Furthermore, the light-emitting diodes can be activated very easily and efficiently. In particular, various desired colors can be represented due to the combination of multiple light-emitting diodes into one single light source. In this way, the desired levels of brightness, colors, color gradients, moving color changes, chases or the like can easily and efficiently be set in the illuminated decorative part by means of simple control electronics. All of this is generally known from the activation of light-emitting diodes, and so it is not necessary to go into further detail at this point.

As has already been mentioned, the illuminated decorative part according to the invention can be constructed extraordinarily compactly, especially in the direction in which the light is emitted toward the observer onto the visible side. It is an extraordinarily simple design, in which, in particular, the scattering element serves as one of the supporting elements and can, for example, be mechanically clipped to support elements that accommodate the light-emitting diodes as light sources. This design as a whole is very flat. By means of the light guide elements between the individual light sources and/or light-emitting diodes and the scattering element, effects such as stripes or the like can be represented very efficiently and brightly. The optical quality of the illuminated decorative part is thus accordingly light. At the same time, a tinted glass appearance or the use of semi-transparent intermediate layers can achieve a design in which a very homogeneous and thus high-quality appearance of the decorative part is achieved when in the deactivated, i.e., not illuminated, state.

In principal, the illuminated decorative part according to the invention can be used in all industries. Its especially preferred use, however, is in the field of the interior design of vehicles. It can be ideally employed here for illuminated design elements and the so-called ambient interior lighting of the vehicle. It is simple and easy to construct and, as has been discussed above, can be implemented with a high degree of crash safety, especially by the use of suitable materials, even when visually high-quality materials, such as PMMA, are utilized. In particular, the semi-transparent intermediate layer can be configured in the form of a polycarbonate film, which further increases crash safety.

Further advantageous embodiments of the illuminated decorative part according to the invention as well as its use can also be found in the exemplary embodiment, which will be discussed in greater detail below with reference to the figures.

BRIEF DESCRIPTION OF THE DRAWING FIGURES

Figure 2:
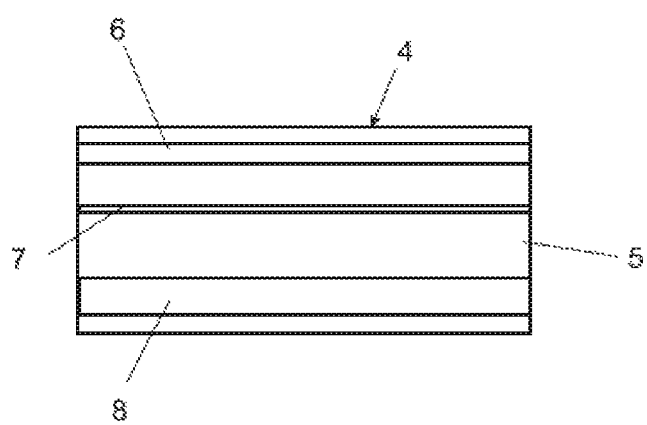
Figure 3:
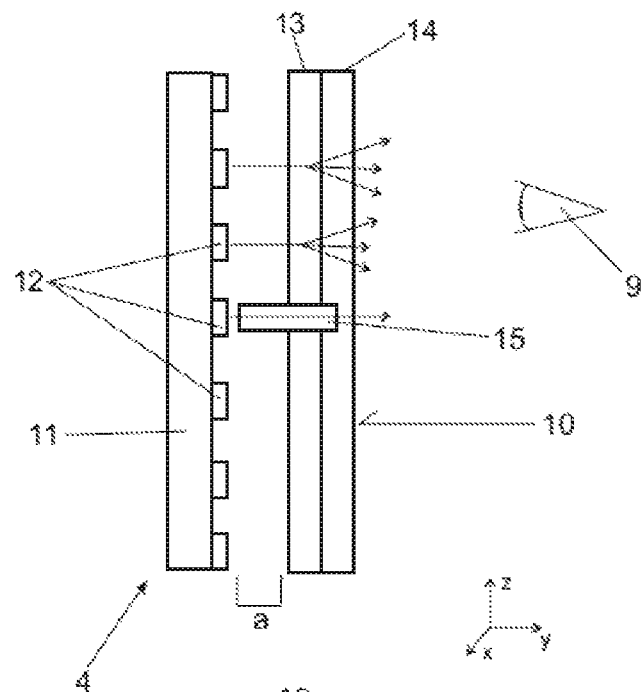
Figure 4:
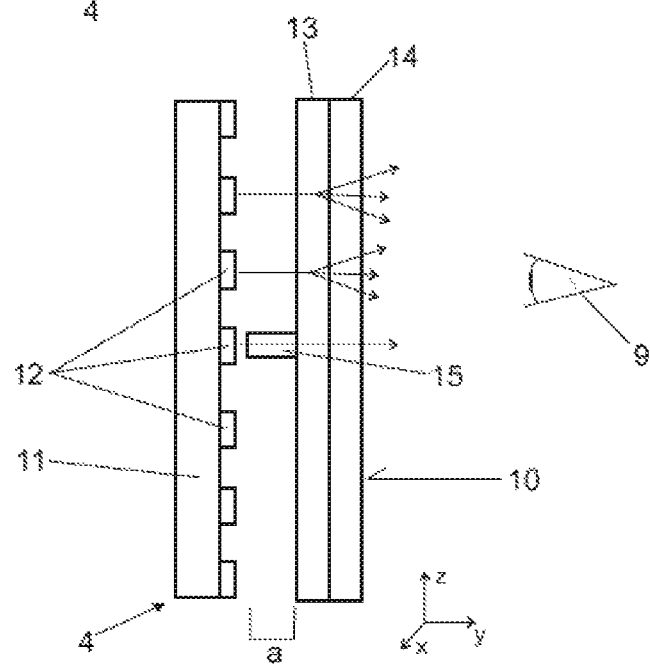
Figure 5:
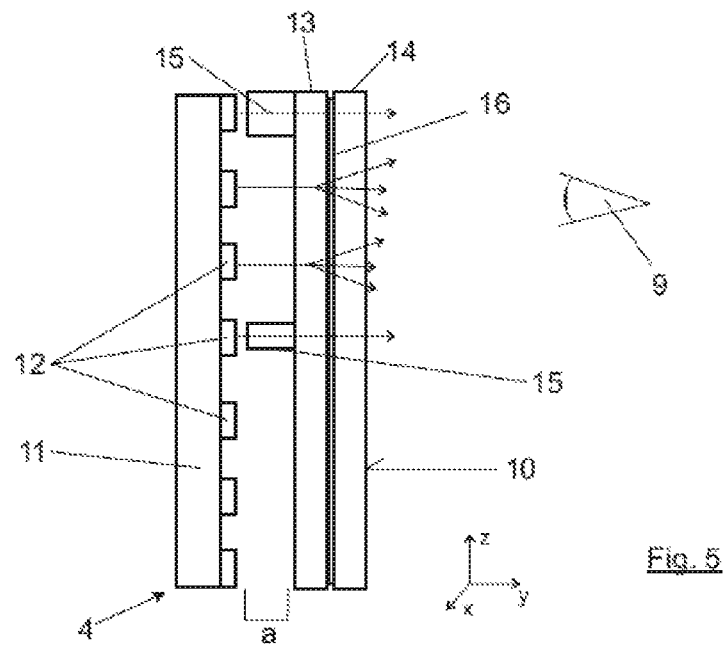
Figure 6:
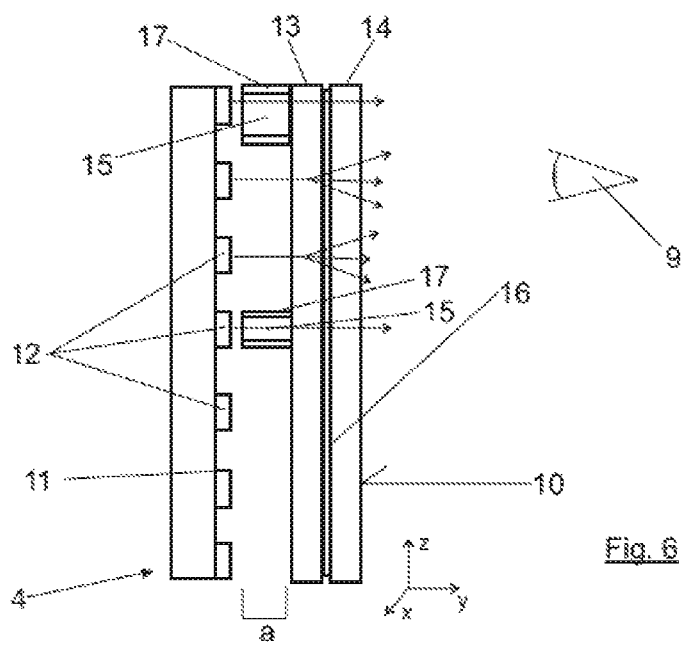

The following is shown:

FIG. 1 an exemplary interior view of a section of a motor vehicle;

FIG. 2 an enlarged representation of a detail II in FIG. 1;

FIG. 3 a sectional view through an illuminated decorative part in a first possible embodiment according to the invention;

FIG. 4 a sectional view through an illuminated decorative part in a second possible embodiment according to the invention;

FIG. 5 a sectional view through an illuminated decorative part in a third possible embodiment according to the invention; and FIG. 6 a sectional view through an illuminated decorative part in a fourth possible embodiment according to the invention.

DETAILED DESCRIPTION

A section of a dashboard 1 of a vehicle, which is not shown in its entirety, can be discerned in the drawing in FIG. 1. This section substantially shows the region of the dashboard 1 in front of the so-called passenger seat between an exemplarily shown A-pillar 2 of the vehicle and a display 3, which can be discerned on the left edge of the image and which should be a part of the central console of the vehicle. Two exemplary illuminated decorative parts are arranged in the vicinity of the dashboard, each of which is identified with 4 and which are configured here as continuous decorative stripes running through the vehicle dashboard 1 transverse to the driving direction. These illuminated decorative parts 4, the structural details of whose design will be discussed later, are typically configured with a flat and thus lightly curved surface, which is normally convexly curved toward the observer. For the sake of simplification, the discussion that follows is of a flat surface, even if it can be concave or convex in practice. The term perpendicular to the surface should then be understood in each case to mean parallel to the optical axis of the curved surface.

The section from the illuminated decorative part 4 that is marked and identified with II in FIG. 1 is again shown in an enlarged image in the drawing according to FIG. 2. When the lighting is switched off, the surface of the illuminated decorative part typically has a homogeneous monochromatic, e.g., black, surface. When the lighting is switched on, the stripe pattern shown in FIG. 2 appears, for example, in which three horizontal stripes 6, 7, 8 of different thicknesses stand out from the homogeneously illuminated surface of the decorative part 4, which is designated 5 in the drawing in FIG. 2. The surface designated 5, which extends over the entire height and width of the decorative part 4, can be diffusely illuminated, for example, with a homogeneous color, a color gradient or else changing colors. The three differently broad stripes 6, 7, 8 stand out from this surface 5, for example in a contrasting color or in a complementary color scheme with higher light intensity, as exemplary possibilities for configuring the decor of the illuminated decorative part 4 in the activated state. To illustrate the design even further, sectional views through the decorative part 4 are indicated in an exemplary fashion in the figures that follow, wherein one stripe, such as stripe 7, is produced in the sectional views in FIGS. 3 and 4, while two of the stripes, such as stripes 6 and 7, are produced in the drawings in FIGS. 5 and 6.

In the schematic sectional view in FIG. 3, the eye 9 of the observer is indicated. The observer views the visible side 10 of the illuminated decorative part 4, in particular substantially perpendicular to the surface of the visible side 10, wherein the direction of this surface is indicated with X and Y, while the orthogonal direction thereto is indicated with Y. From left to right, the design consists of a support element 11, on which a matrix of light-emitting diodes 12 is installed as light sources. The support element 11 itself can preferentially be black, at least on the side facing the observer 9, so that none of the functional elements shine through the decorative part 4 when it is not illuminated. In the design according to FIG. 3, a space designated a, in which the light can spread accordingly, is downstream of the individual light-emitting diodes 12. Downstream of this space is an optical scattering element 13, which is shown divided in two in the drawing in FIG. 3, and which bears a decorative layer 14 on the side facing the observer 9. The optical scattering element 13 and/or the two optical scattering elements 13 shown in the embodiment according to FIG. 3 can be produced from a high-quality optical material, such as PMMA (polymethylmethacrylate). They can be made of the material marketed under the brand name "Plexiglas" and variant df23 or 0v200. This optically high-quality material is then provided with the transparent decorative layer 14—preferentially by being sprayed on—on the visible side 10. This can be produced with a tinted glass appearance, for example, and can be sprayed onto the scattering element 13 or scattering elements 13. When a suitable material is used, such as polycarbonate, the level of crash safety can be shown for the vehicle, which would not be the case with PMMA.

In the drawing according to FIG. 3, a light guide that is identified with 15 is shown in cross-section arranged between one of the light-emitting diodes 12 and the decorative layer 14. This light guide 15 is clear and thus permits the light from the LEDs 12 downstream of it in the Y direction to pass almost directly through the transparent top layer 14. The center line 7 shown in FIG. 2, for instance, can be produced in this way.

The division of the optical scattering element 13 into multiple individual elements, as is indicated in the drawing in FIG. 1, is comparatively complex with regard to its structure. Additionally, it results in the observer 9 having a very good view of the light-emitting diodes 12 directly behind the light guide 15 in the illuminated state, and so individual illuminated points rather than an illuminated line can be discerned. For this reason, the variant selected in the drawing according to FIG. 4 is somewhat better suited for the illuminated decorative part 4 in terms of design and light effect. The design shown there substantially corresponds to the design already discussed within the framework of FIG. 3, wherein the same elements are likewise provided with the same reference signs here. The light guide 15 in this instance is not configured with a very small space above the light-emitting diodes 12 and then continuously to the decorative layer 14, but instead, as in the drawing in FIG. 3, begins with a very small space above each light-emitting diode 12 and then does not directly contact the decorative layer 14 but rather the scattering element 13, which is configured here over the entire surface. The advantage of the design consists on the one hand in that the decorative layer 14 can be applied to the scattering element 13, e.g., sprayed on, as a base layer. The light guide 15 is then positioned behind the scattering element 13, as viewed by the observer 9, and emits its light very directly into the scattering element. This results in a representation of the line 7, for example, in a manner similar to the drawing in FIG. 3. The edge of the line will be slightly more diffuse than in the embodiment previously described, but the structure is much simpler and the risk that individual points of light will be discerned is reduced by the scattering by the scattering element 13. The space a thus provides for a sufficient scattering of the light and even backlighting of the entire scattering element 13, and so the surface of the decorative part 4 designated 5 in the drawing in FIG. 2 can be illuminated largely homogeneously. Additionally, stripes, dots or the like can be represented by the light guides 15 and can be produced on the visible side 10 by directly coupling the light via the light guides 15, without space a, into the scattering element with a higher level of brightness and thus good perceptibility for the observer 9.

So that the functional elements of the decorative part 4 do not shine through when in the deactivated state, the decorative layer 14 in the embodiment according to FIGS. 3 and 4 can be configured with the aforementioned tinted glass appearance, for example. Furthermore, it is also possible, and it is represented in this way in the exemplary embodiment in FIG. 5, that the decorative layer 5 is configured to be almost arbitrarily transparent. In this case, a semi-transparent intermediate layer 16 is arranged between the decorative layer 5 and the scattering element 13. This semi-transparent intermediate layer 16 can preferentially be configured as a film. Films of this type are generally known from the prior art for display instruments in vehicles. They produce a so-called black panel effect, in which none of the functional elements of the illuminated decorative part 4 shines through to the surface in the non-illuminated state, and so the surface has an even and opaque appearance that is influenced in its color, for example, by the additionally applied decorative layer 14 or can be provided with a desired structure and/or desired surface optics.

A further difference in the drawing in FIG. 5, which should otherwise be understood to be similar to FIG. 4 but could also be executed similar to FIG. 3, is the use of a further light guide 15 so that the illuminated decorative part 4 indicated in the drawing in FIG. 5 can display two of the lines, for example, in particular line 6 and line 7 from the drawing in FIG. 2. The width of the light guide 15, in the Z direction in the drawing in FIG. 5, constructively defines the width of the line 6, 7, wherein it should be recognized here that line 7, which is formed by the lower light guide 15 in the drawing in FIG. 5, is accordingly more narrow than line 6, which is formed by the upper light guide 15, similar to the drawing in FIG. 2.

The representation in FIG. 5 is used again in FIG. 6. Of course, the design could be configured similar to the drawings in FIGS. 3 and 4 here, as well. In the drawing in FIG. 6, a mask, such as in the form of a sheath of the light guides 15, is arranged as an additional element around the two light guides 15, specifically in the Z and X directions. These masks and/or sheaths, which are identified with 17 in the drawing in FIG. 6, ensure that less light from the clear light guides 15 emerges from the light guides 15 laterally, i.e., contrary to direction Y, which is orthogonal to the visible side 10. In so doing, the portion of light that reaches the decorative layer 14 from the light guides 15 is increased again, and so the contrast between the bright stripes 6, 7 in a design according to the drawing in FIG. 6 is once more increased relative to the illuminated surface 5 in order to be able to produce an even more brilliant optical image of the illuminated decorative part 4 as a result of the even higher contrast.

The design of the optical decorative part 4 in the embodiments described can then be constructed extraordinarily compactly in the Y direction, since the individual layers themselves can be made very thin, and since the space a can be selected to be relatively small in order to achieve the desired optical effect. The individual stripes 6, 7, 8 or other geometric patterns or (written) symbols can accordingly be produced by the light guides 15, wherein other shapes, figures and so on can also be represented on the visible side 10 of the illuminated decorative part 4, depending upon the configuration and size of the light guides. The activation of the light-emitting diodes 12, which are preferentially arranged in the form of a matrix on the support element 11, can be freely programmable by an electronic control device in a manner that is known per se with respect to the intensity, light color, representation of chases or the like. The very compact design is simple to produce and install, for example by providing the support element 11 with a plate that has the matrix of the light-emitting diodes 12. At the same time, the decorative layer 14 is sprayed onto the scattering element 13, and the light guides 15 are connected, e.g., adhered, to the scattering element 13 in the required positions. This structure can then be mechanically clipped, for example, to the support element 11 in order to achieve a simple and efficient installation. The illuminated decorative part 4 obtained in this way, for instance, a decorative stripe for the vehicle dashboard 1, can then be installed in the vehicle as a whole component and must only be wired within the vehicle dashboard to provide power to the light-emitting diodes 12. However, this wiring can also include a connection to the appropriate control device so that the desired optical representation, such as to support the ambient lighting of the vehicle interior with a high level of optical brilliance and quality, can be implemented according to a predetermined or selectable illumination concept.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An illuminated decorative part comprising:
a flat visible side facing an observer;
multiple discrete light sources arranged in an illumination region behind the flat visible side as viewed by the observer;
a flat scattering element, which is partially transparent, configured to influence light, and arranged between the flat visible side and the illumination region;
light guides configured for guiding the light in a direction orthogonally to a surface of the flat visible side are arranged between the at least one flat scattering element and at least one, but not all, of the multiple discrete light sources, wherein the light guides are in contact with a first side of the flat scattering element; and
a decorative layer sprayed on a second side of the flat scattering element, wherein the first side of the flat scattering element is opposite of the second side of the flat scattering element, wherein the decorative layer is tinted so that the decorative layer is translucent only when the multiple discrete light sources are switched on and so that the decorative layer is not translucent when the multiple discrete light sources are switched off.

2. The illuminated decorative part of claim 1, wherein there is a space between the multiple discrete light sources and the flat scattering element in the direction orthogonal to the surface of the flat visible side, wherein the space in regions in which the light guides are arranged is smaller than in regions of the flat scattering element without the light guides.

3. The illuminated decorative part of claim 1, wherein the light guides are configured to not scatter light.

4. The illuminated decorative part of claim 1, wherein the light guides have a non-transparent mask over at least part of a surface on edges of the light guides that run perpendicular to the surface of the flat visible side.

5. The illuminated decorative part of claim 1, wherein the flat scattering element is arranged over an entirety of a rear surface of the flat visible side.

6. The illuminated decorative part of claim 1, wherein the decorative layer is tinted glass.

7. An illuminated decorative part comprising:
a flat visible side facing an observer;
multiple discrete light sources arranged in an illumination region behind the flat visible side as viewed by the observer;
a flat scattering element, which is partially transparent, configured to influence light, and arranged between the flat visible side and the illumination region;
light guides configured for guiding the light in a direction orthogonally to a surface of the flat visible side are arranged between the at least one flat scattering element and at least one, but not all, of the multiple discrete light sources, wherein the light guides are in contact with a first side of the flat scattering element;
a semi-transparent intermediate layer arranged on a second side the flat scattering element, wherein the semi-transparent intermediate layer is a film, and wherein the first side of the flat scattering element is opposite of the second side of the flat scattering element, and wherein the semi-transparency of the semi-transparent intermediate layer produces a black panel effect when the multiple discrete light sources are turned off;
a decorative layer arranged on the semi-transparent intermediate layer.

8. The illuminated decorative part of claim 1, wherein the multiple discrete light sources are a field of light-emitting diodes arranged on a support element.

9. A vehicle, comprising:
an interior, which includes a dashboard on which is mounted an illuminated decorative part, which comprises
a flat visible side facing an observer;

multiple discrete light sources arranged in an illumination region behind the flat visible side as viewed by the observer;

a flat scattering element, which is partially transparent, configured to influence light, and arranged between the flat visible side and the illumination region;

light guides configured for guiding the light in a direction orthogonally to a surface of the flat visible side are arranged between the at least one flat scattering element and at least one, but not all, of the multiple discrete light sources, wherein the light guides are in contact with a first side the flat scattering element; and a decorative layer sprayed on a second side the flat scattering element, wherein the first side of the flat scattering element is opposite of the second side of the flat scattering element, wherein the decorative layer is tinted so that the decorative layer is translucent only when the multiple discrete light sources are switched on and so that the decorative layer is not translucent when the multiple discrete light sources are switched off, wherein the illuminated decorative part is configured to provide ambient interior lighting of the vehicle interior.

* * * * *